(12) United States Patent
Hugosson et al.

(10) Patent No.: US 9,591,319 B2
(45) Date of Patent: Mar. 7, 2017

(54) VIDEO ENCODER

(75) Inventors: Ola Hugosson, Lund (SE); Erik Persson, Lund (SE)

(73) Assignee: ARM Limited, Cambridge (GB)

(*) Notice: Subject to any disclaimer, the term of this patent is extended or adjusted under 35 U.S.C. 154(b) by 1502 days.

(21) Appl. No.: 12/926,909

(22) Filed: Dec. 16, 2010

(65) Prior Publication Data

US 2011/0150090 A1 Jun. 23, 2011

(30) Foreign Application Priority Data

Dec. 16, 2009 (GB) .................................. 0922001.3

(51) Int. Cl.
| | | |
|---|---|---|
| H04B 1/66 | (2006.01) |
| H04N 7/12 | (2006.01) |
| H04N 11/02 | (2006.01) |
| H04N 11/04 | (2006.01) |
| H04N 19/436 | (2014.01) |
| H04N 19/51 | (2014.01) |
| H04N 19/61 | (2014.01) |
| H04N 19/423 | (2014.01) |

(52) U.S. Cl.
CPC ......... *H04N 19/436* (2014.11); *H04N 19/423* (2014.11); *H04N 19/51* (2014.11); *H04N 19/61* (2014.11)

(58) Field of Classification Search
USPC ............ 375/240.01, 240.15, 240.26, 240.12, 375/E07.026, E07.243
See application file for complete search history.

(56) References Cited

U.S. PATENT DOCUMENTS

| | | | | |
|---|---|---|---|---|
| 6,067,321 A | * | 5/2000 | Lempel | 375/240.24 |
| 6,091,455 A | * | 7/2000 | Yang | 375/240.01 |
| 6,100,931 A | * | 8/2000 | Mihara | 375/240.12 |
| 6,198,769 B1 | * | 3/2001 | Mihara | 375/240.12 |
| 7,936,814 B2 | * | 5/2011 | Greenfield et al. | 375/240.01 |
| 2003/0138045 A1 | * | 7/2003 | Murdock et al. | 375/240.12 |

(Continued)

FOREIGN PATENT DOCUMENTS

JP 2008-311824 12/2008

OTHER PUBLICATIONS

UK Search Report for Application No. GB 0922001.3, dated Feb. 25, 2010.

(Continued)

*Primary Examiner* — Christopher S Kelley
*Assistant Examiner* — Ana Picon-Feliciano
(74) *Attorney, Agent, or Firm* — Nixon & Vanderhye P.C.

(57) ABSTRACT

A video encoding apparatus for encoding a video stream comprises a reference frame cache for reference frame video data retrieved from a reference frame storage unit in external memory, which is derived from an individual frame of the video stream. First and second source frame storage units store first and second blocks of unencoded video data taken from first and second source frames of the video stream, respectively. First and second video encoders perform first and second encoding operations to encode the first and second blocks of unencoded video data with reference to the reference frame video data cached in the reference frame cache, respectively. The first video encoder and the second video encoder perform the first encoding operation and the second encoding operation in parallel with one another.

33 Claims, 5 Drawing Sheets

(56) References Cited

U.S. PATENT DOCUMENTS

2006/0104369 A1* 5/2006 Kikuchi et al. .......... 375/240.28
2007/0280348 A1* 12/2007 Tokumitsu et al. ...... 375/240.01
2008/0152014 A1* 6/2008 Schreier et al. ......... 375/240.21
2009/0074060 A1* 3/2009 Kim et al. ............... 375/240.12

OTHER PUBLICATIONS

Azevedo, Arnaldo et al., "Parallel H.264 Decoding on an Embedded Multicore Processor", 15 pages.
Chen, Yen-Kuang et al., "Implementation of H.264 Encoder and Decoder on Personal Computers", Journal of Visual Communication and Image Representation, pp. 1-19.

* cited by examiner

VIDEO ENCODER

BACKGROUND OF THE INVENTION

Field of the Invention

The present invention relates to a video data processing apparatus, and in particular relates to encoding of video by such a video data processing apparatus.

Description of the Prior Art

Contemporary encoding standards, such as H.264, incorporate many advanced techniques to achieve a high degree of coding efficiency, for example multi-picture inter-picture prediction, intra-coding and various entropy encoding techniques. Nevertheless, despite the great advances in encoding efficiency that have been achieved, video system designers naturally continually strive to design video systems which operate at (or close to) the achievable limits of video quality and frame transmission rates.

Although dramatic compression ratios may be achieved by contemporary video encoding standards, video systems for performing encoding must be able to handle the high bandwidths of video data that result from the output of the high resolution and frame rate video cameras that are currently available. Indeed, in such systems the volume of video data traffic is typically the dominant bandwidth on the system bus. A further critical constraint on the system bandwidth is the random access memory bandwidth. The DRAM (Dynamic Random Access Memory) storage units employed by contemporary video systems have a limited bandwidth for accessing their stored data. If the system design requires a higher bandwidth, then this may necessitate the inclusion of an additional DRAM device, which in certain space-limited systems (such as embedded video encoders) may not be viable. Hence it will be recognised that bandwidth at the system level is a critical parameter in such systems.

Nevertheless, it is well known that consumers are hard taskmasters, continually demanding higher specifications and new features from contemporary video systems. For example, a slow motion capability on video cameras is a popular feature, yet the increased frame rate that this requires can be become a serious demand on the system bandwidth. A typical encoding pattern for video data comprises an initial intra-coded frame ("I-frame") followed by a series of predicted pictures ("P-frames") which are each predicted with reference to the previous frame. Since video data bandwidth increases approximately linearly with frame rate, there may be little capacity for an increase in frame rate in a video system which is already operating close to its full bandwidth capacity.

Some papers which discuss implementations of H.264 encoding and decoding are: "Implementation of H.264 Encoder and Decoder on Personal Computers", Y.-K. Chen, E. Q. Li, X. Zhou, and S. L. Ge, in Journal of Visual Communications and Image Representations, vol. 17, no. 2, pp. 509-532, April 2006; and "Parallel H.264 Decoding on an Embedded Multicore Processor", Azevedo, A., Meenderinck, C., Juurlink, B., Terechko, A., Hoogerbrugge, J., Alvarez, M., and Ramirez, A., 2009, In *Proceedings of the 4th international Conference on High Performance Embedded Architectures and Compilers*.

It would be desirable to provide an improved technique for performing video encoding which enables an increase in frame rate, without a proportional increase in the bandwidth required to handle the consequent video data.

SUMMARY OF THE INVENTION

Viewed from a first aspect, the present invention provides a video encoding apparatus for encoding a video stream comprising: a reference frame cache configured to cache reference frame video data retrieved from a reference frame storage unit in external memory, said reference frame video data cached in said reference frame cache being derived from an individual frame of said video stream; a first source frame storage unit configured to store a first block of unencoded video data taken from a first source frame of said video stream; a second source frame storage unit configured to store a second block of unencoded video data taken from a second source frame of said video stream; a first video encoder configured to perform a first encoding operation to encode said first block of unencoded video data with reference to said reference frame video data cached in said reference frame cache; and a second video encoder configured to perform a second encoding operation to encode said second block of unencoded video data with reference to said reference frame video data cached in said reference frame cache, wherein said first video encoder and said second video encoder are configured to perform said first encoding operation and said second encoding operation in parallel with one another.

Accordingly, the present invention provides a video encoding apparatus comprising a reference frame cache and two source frame storage units. The reference frame cache is configured to cache reference frame video data which is used for the above mentioned predictive techniques for encoding the video data stored in the first source frame storage unit and the second source frame storage unit. The video encoding apparatus further comprises two video encoders which encode blocks of unencoded video data stored in the first and second source frame storage units respectively. The encoding operations carried out by the first and second video encoders are performed in parallel with one another, both video encoders making reference to the same reference frame video data cached in the referenced frame cache.

Consequently, because both video encoders perform their respective encoding operations with reference to the same cached reference frame video data, the bandwidth requirement for this arrangement is approximately half that which would be required for two video encoders operating in parallel, but independently.

The inventors of the present invention realised that a bandwidth efficient video encoder could be provided, by performing parallel encoding on blocks of video data taken from two different source frames in the video stream, by performing those parallel encoding operations with reference to reference frame video data derived from the same individual frame of the video stream. It will be recognised the reduction in bandwidth achieved for a higher frame rate can only come at the expense of some quality, since one of the encoders will be performing its encoding operation with reference to more temporally remote reference frame video data, yet in some implementations, such as enabling a slow motion feature on a video camera, this trade off has been found to be acceptable.

The video encoding apparatus may only comprise two video encoders operating in parallel, but according to one embodiment said video encoding apparatus further comprises at least one further source frame storage unit, each at least one further source frame storage unit configured to store at least one further block of unencoded video data taken from at least one further source frame of said video stream; and at least one further video encoder configured to perform at least one further encoding operation to encode said at least one further block of unencoded video data with reference to said reference frame video data cached in said reference frame cache, wherein said at least one further video encoder is configured to perform said at least one further encoding operation in parallel with said first encoding operation and said second encoding operation.

Accordingly, at least one further source frame storage unit storing blocks of unencoded video data from at least one further source frame of the video stream is provided, along with at least one further video encoder configured to perform its encoding operation with reference to the same cached referenced frame video data being used by the first and second video encoders, and furthermore to perform its encoding in parallel with the first and second video encoder. In this way, a triple frame rate may be handled, for only a modest increase in the bandwidth requirement, since the same reference frame video data is used, and only the additional blocks of unencoded video data from the further source frame of the video stream need to be retrieved. Equally, even higher frame rates may be handled (4×, 5× etc.) if further video encoders are correspondingly added.

The parallel video encoders may perform their encoding operations with reference to reference video data derived from only one individual frame of the video stream, but according to one embodiment at least one of said first video encoder and said second video encoder is configured to perform its respective encoding operation with reference to further reference frame video data cached in said reference frame cache and derived from at least one further individual reference frame.

It is known in contemporary video encoding standards that encoding efficiencies may be gained by performing video encoding with reference to more than one video reference frame. Hence, either or both of the first and second video encoder may, in some embodiments perform their encoding also operations with reference to an additional reference frame, the reference frame video data from this additional reference frame also being cached in the reference frame cache.

Similarly, in embodiments where three or more video encoders are provided, in some such embodiments said at least one further video encoder is configured to perform said at least one further encoding operation with reference to said further reference frame video data cached in said reference frame cache and derived from at least one further individual reference frame. In this way the further video encoders (third, fourth etc) may also contribute to the encoded efficiency by performing their encoding operations with reference to additional video reference frames.

According to some embodiments, at least one of said first video encoder and said second video encoder is configured to perform mono-directional prediction encoding. Mono-directional prediction encoding comprises performing video encoding with reference to video reference frame data taken from a frame (or frames) which is in one direction (typically in advance of) with respect to the source frame being encoded. A source frame thus encoded is sometimes referred to as a P-frame ("predicted picture").

In some embodiments, at least one of said first video encoder and said second video encoder is configured to perform bi-directional prediction encoding. In such embodiments, the source frame being encoded is encoded with reference to reference frame video data taken from frames both in advance of and following the source frame. A frame of video data thus encoded is sometimes referred to, as a B-frame ("bi-predictive picture").

In some embodiments, one of said first video encoder and said second video encoder is configured to perform mono-directional encoding and the other of said first video encoder and said second video encoder is configured to perform bi-directional prediction encoding. In other words, one of the video encoders generates a P-frame, whilst the other generates a B-frame.

Similarly, in embodiments where there is at least one further video encoder, this further video encoder may perform mono-directional or bi-directional prediction encoding. In one embodiment, said at least one further video encoder is configured to perform mono-directional predication encoding, whereas in another embodiment said at least one further video encoder is configured to perform bi-directional prediction encoding.

In order to allow a continuous process of encoding a received video stream, it may be necessary to reconstruct a block of video data after it has been encoded, to provide reference data for further encoding operations. Hence, in one embodiment said first video encoder is further configured to perform a decoding operation on encoded video data resulting from said first encoding operation to generate a reconstructed block for storage in said reference frame storage unit in said external memory. Hence, the output of the first video encoder is reconstructed and thus provides the reference frame data stored in the external memory.

The reference frame video data cached in the reference frame cache may be organised in a number of different ways, but in one embodiment said reference frame video data cached in said reference frame cache derived from said individual frame of said video stream comprises neighboring blocks spatially adjacent to said first and second block of unencoded video data. Caching a set of neighbouring blocks that are spatially adjacent to the first and second block of unencoded video data. This presents an advantageous selection of reference frame video data since not only is the reference frame video data more likely to be relevant to the first and second block of unencoded video data (since it is spatially close to those blocks), but also the reference frame cache is efficiently used since both the first and second block of unencoded video data are likely to find relevant reference frame data for their encodings.

The first and second source frame storage unit may take a number of forms, but in some embodiments said first source frame storage unit and said second source frame storage unit are buffers. This presents an advantageous arrangement for handling streaming video data. Similarly, in some embodiments said at least one further source frame storage unit is a buffer.

The video stream to be encoded may be stored in a variety of ways in the external memory, but in one embodiment said video stream is retrieved from a FIFO in said external memory. This also presents an advantageous arrangement for handling a stream of video data being provided to the external memory, for example from a video camera in recording mode.

The video stream being encoded may derive from a range of different sources, but in embodiments, said video stream is generated in a slow motion recording mode. Slow motion recording is typically effected by recording video data at a higher frame rate than usual, for example at 120 FPS (frames per second) instead of 60 FPS, whilst later playing back the video stream at the usual frame rate (60 FPS in this example). If the video encoding apparatus were to attempt to encode this higher frame rate video data in its normal processing mode, the bandwidth requirement imposed on the system of which the video encoding apparatus forms part would rise significantly, and could well exceed the system capabilities. However, by the techniques of the present invention, a frame rate such as that which is required for a slow motion recording mode is achieved, without commensurately increasing the bandwidth requirement.

In some embodiments, said first source frame of said video stream and said second source frame of said video stream are sequential in said video stream.

Viewed from a second aspect the present invention provides a method of encoding a video stream comprising the steps of: retrieving reference frame video data from a reference frame storage unit in external memory; caching said reference frame video data in a reference frame cache, said reference frame video data cached in said reference frame cache being derived from an individual frame of said video stream; receiving a first block of unencoded video data taken from a first source frame of said video stream; storing said first block of unencoded video data in a first source frame storage unit; receiving a second block of unencoded video data taken from a second source frame of said video stream; storing said second block of unencoded video data in a second source frame storage unit; performing a first encoding operation to encode said first block of unencoded video data with reference to said reference frame video data cached in said reference frame cache; and performing a second encoding operation to encode said second block of unencoded video data with reference to said reference frame video data cached in said reference frame cache, wherein said first encoding operation and said second encoding operation are performed in parallel with one another.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
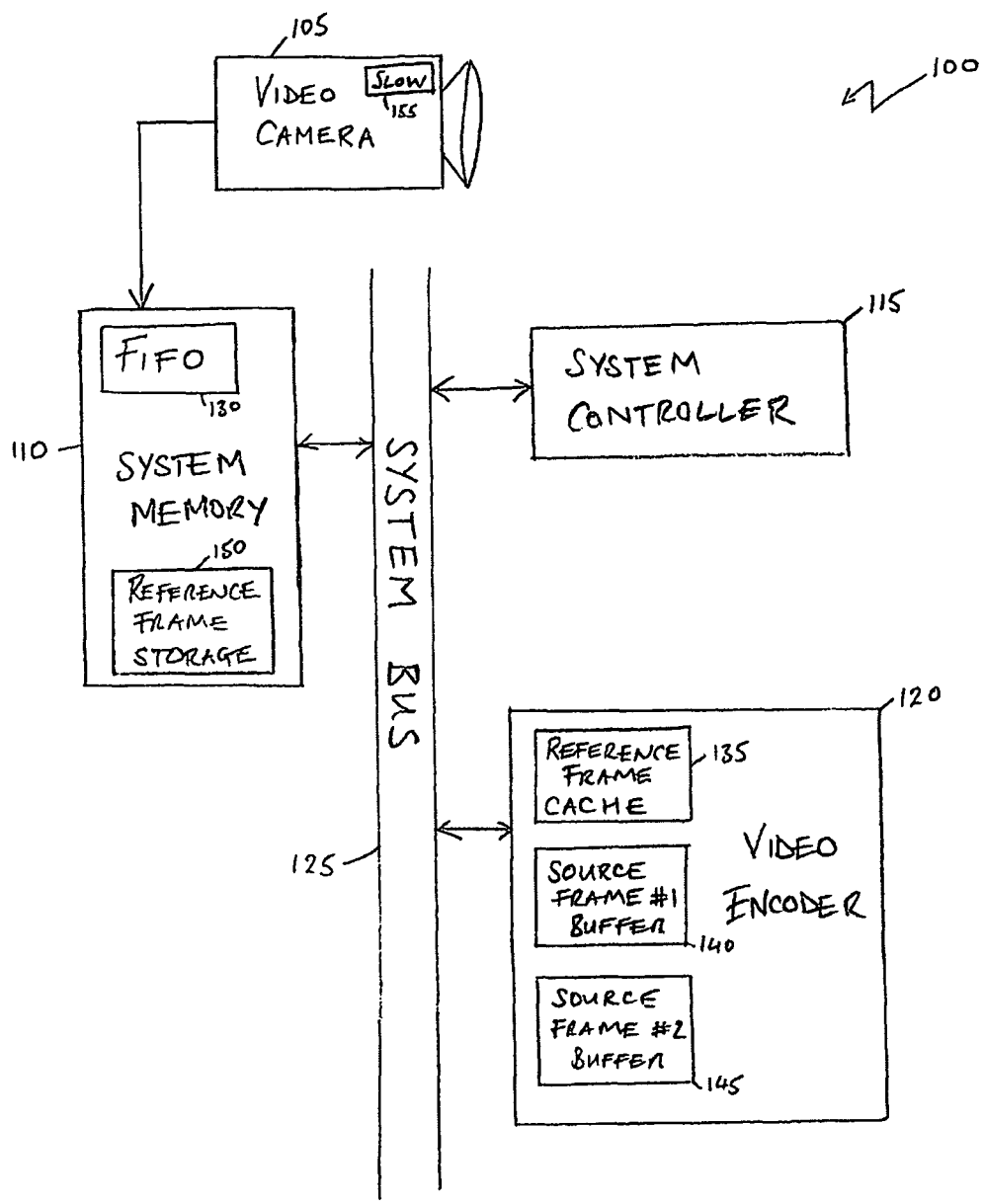
FIG. 1 schematically illustrates a video system comprising a video camera, system memory and video encoder.

FIG. 1 schematically illustrates a video system according to one embodiment. This video system 100 comprises video camera 105, system memory 110, system controller 115, video encoder 120 and system bus 125. It will be understood that video system 100 will typically comprise various other components, however these are not illustrated here for clarity purposes. In operation the user employs video camera 105 to capture video footage which is passed, in the form of a stream of video data, to system memory 110, where it is received by FIFO 130. FIFO 130 is able to temporarily store the video data generated by video camera 105 for a sufficient time period for the video data to be accessed and encoded by video encoder 120.

Video encoder 120, system memory 110 and system controller 115 communicate via system bus 125. In this embodiment system bus 125 is configured in accordance with the AMBA (Advanced Microcontroller Bus Architecture) specification developed by ARM Limited of Cambridge, UK. These components connect to the bus via interconnects configured in accordance with the Advanced eXtensible Interface (AXI) also of ARM Limited, Cambridge, UK. System controller 115 is configured to provide overall control of the video system 100.

Video encoder 120 comprises two video encoding engines (described in more detail with reference to FIG. 2). Video encoder 120 also comprises reference frame cache 135, first source frame buffer 140 and second source frame buffer 145. The two video encoding engines of video encoder 120 are configured to perform their encoding operations in parallel, the first video encoding engine being configured to encode first source frame video data buffered in first source frame video buffer 140, and the second video encoding engine being configured to encode video data buffered in second source frame buffer 145. Notably, both video encoding engines perform their encoding operations with reference to the same video reference frame data cached in reference frame cache 135. The video reference frame data cached in reference frame cache 135 is retrieved by video encoder 120, via system bus 125, from the reference frame storage 150 in system memory 110. The video reference frame data stored in reference frame storage 150 is generated by video encoder 120 as part of its video encoding operations, some of the video data it encodes being reconstructed and passed back to system memory 110 for storage in reference frame storage 150. This means that the encoding of unencoded video data in first source frame buffer 140 and second source frame buffer 145 is always performed with reference to previously encoded and reconstructed video data, ensuring that the subsequent process of decoding the encoded video is performed with reference to the same reference data used for its encoding.

The video camera 105 further comprises slow motion button 155, which switches video camera 105 into a slow motion recording mode, in which video footage recorded by the video camera 105 is generated such that when it is played back, the time progression of the recorded footage is slowed down, for example by a factor of two. In some embodiments slow motion button 155 is configured to put video camera 105 into one of a number of slow motion recording modes, each of which has a different slow down rate for the video footage it generates.

When video camera 105 is operating in its normal recording mode, the transfer of unencoded video data from FIFO 130 to video encoder 120, the transfer of reference frame video data from reference frame storage 150 to reference frame cache 135, and the transfer of reconstructed video data from video encoder 120 to reference frame storage 150 place a considerable demand on the available bandwidth of system bus 125. When video camera 105 is switched into slow motion recording mode by operating slow motion button 155, the increased frame rate resulting from this slow motion operation could place an even greater burden on the bandwidth capacity of system bus 125 (since the bandwidth required increases approximately linearly with the frame rate), which could exceed the available capacity, or at least swamp the system bus 125 to such an extent that the overall performance of video system 100 would be significantly downgraded.

However, system controller 115 is configured to identify when video camera 105 has been switched into slow motion recording mode, and to signal this fact to video encoder 120. When video encoder 120 is notified that video camera 105 has switched to slow motion recording mode, it is configured to operate its two video encoding engines in parallel, each performing their respective encoding operations with reference to the same reference frame video data cached in reference frame cache 135. In particular, when operating in this slow motion mode, the two video encoding engines in video encoder 120 are configured to each perform their encoding operations on separate frames of the video stream being generated by video camera 105, where those frames are sequential frames to one another. The reference frame video data (with reference to which they perform their encoding operations) may in some embodiments be the frame which immediately precedes the two frames that the two encoding engines are currently processing, although other embodiments are also possible as will be described later with reference to FIGS. 3 and 4.

Figure 2:
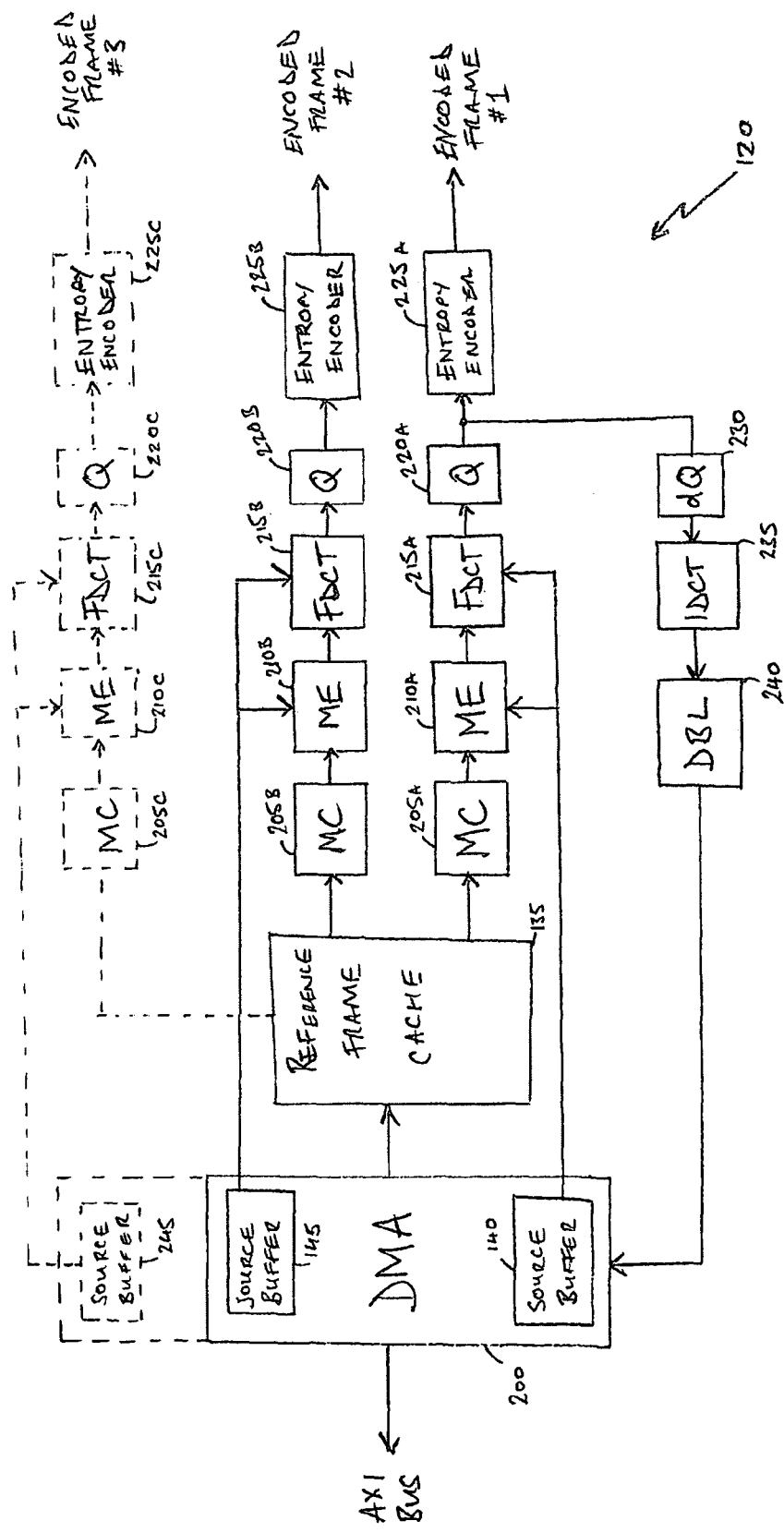
FIG. 2 schematically illustrates in more detail some components of the video encoder shown in FIG. 1.

More detail of the configuration of video encoder 120 is now given with reference to FIG. 2. First source frame buffer 140 and second source frame buffer 145 (see FIG. 1) are illustrated in FIG. 2 as embodied in DMA unit 200. DMA 200 is connected to system bus 125 (not illustrated) and issues memory access requests onto the bus in order to retrieve blocks of unencoded video data from FIFO 130 and reference frame video data from reference frame storage 150. The two video encoding engines in video encoder 120 share reference frame cache 135. The first video encoding engine is comprised of motion compensator (MC) 205A, motion estimator (ME) 210A, forward discrete cosine transformer (FDCT) 215A, quantizer (Q) 220A and entropy encoder 225A. Similarly, the second encoding engine comprises motion compensator (MC) 205B, motion estimator (ME) 210B, forward discrete cosine transformer (FDCT) 215B, quantizer (Q) 220B and entropy encoder 225B. In addition, the first encoding engine further comprises dequantizer (dQ) 230, inverse discrete cosine transformer (IDCT) 235 and deblocker (DBL) 240. These additional components of the first video encoding engine are used to reconstruct the encoded video data generated by the first encoding engine for storage in reference frame storage 150 (via DMA 200).

Figure 3A:
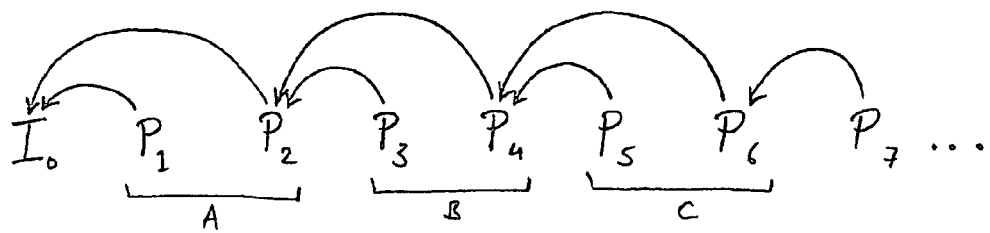
FIGS. 3A, 3B and 3C schematically illustrate some encoding patterns of sequential P-frames.

In one embodiment, when video camera 105 is operating in slow motion mode, the encoding of the sequence of frames in the generated video stream is performed as is illustrated in FIG. 3A. FIG. 3A schematically illustrates the reference relationships between the sequence of frames. $I_0$ is an "Intra-coded" frame which does not require reference to another frame in order to be decoded, i.e. it is a fully specified image, much like a conventional static image file. The other illustrated frames, $P_1$, $P_2$ etc are P-frames ("predicted") which are encoded with reference to another (earlier) frame. The parallel operation of the two video encoding engines in video encoder 120 is illustrated in the example of FIG. 3A by the pairs of frames A, B, C etc. In other words, the first video encoding engine encodes frame $P_2$ with reference to frame $I_0$, whilst the second video encoding engine encodes frame $P_1$ also with reference to frame $I_0$. By sharing reference frame cache 135 and performing their respective encoding operations with reference to the same reference frame video data, the video encoding engines in video encoder 120 keep pace with the increased frame rate generated by video camera 105 in its slow motion mode, without significantly increasing the bandwidth demand placed by video encoder 120 on system bus 125, since the same reference frame video data is used by both encoding engines. Note that subsequently the first video encoding engine encodes frame $P_4$ whilst the second video encoding engine encodes frame $P_3$, both performing these encoding operations with reference to previously encoded frame $P_2$. The first video encoding engine in video encoder 120 has the additional reconstruction components dQ 230, IDCT 235 and DBL 240 to enable a reconstructed version of frame $P_2$ to be returned to reference frame storage 150, such that it may be retrieved and stored in reference frame cache 135 when the video encoding engines are encoding frame $P_3$ and $P_4$. It will be recognised that this technique for performing video encoding operations on a video stream with an increased frame rate will necessarily come at the price of a reduction in the video quality, for example (with reference to FIG. 3A) frame $P_2$ would be more accurately encoded if it were instead encoded with reference to the immediate preceding frame $P_1$, however this would require the first encoding engine (encoding frame $P_2$) and the second encoding engine (encoding frame $P_1$) to perform their encoding operations with reference to two different reference frames (namely $P_1$ and $I_0$ respectively) which would significantly increase the bandwidth requirement demanded of system bus 125. It has been found that the small reduction in quality can be an acceptable trade off, for example when encoding a video stream generated by video camera operating in slow motion mode.

Returning to FIG. 2, note that an alternative configuration is also illustrated (shown by the dashed lines), wherein the video encoder 120 comprises a further video encoder. This further video encoder is configured like the second video encoder, and consequently comprises MC 205C, ME 210C, FDCT 215C, Q 220C and entropy encoder 225C. Also, when this third video encoder is present, the DMA 200 comprises a further source buffer 245. The presence of this third video encoding engine enables the video encoder 120 to perform video encoding on a video stream with three times the frame rate (as compared to twice the frame rate as illustrated in FIG. 3A). For the FIG. 3B example P-frames $P_1$, $P_2$ and $P_3$ are encoded in parallel (label A) by the three encoding engines, with reference to a single reference frame $I_0$. Subsequently P-frames $P_4$, $P_5$ and $P_6$ are encoded in parallel (label B) with reference to previously encoded P-frame $P_3$. Note that when the set of frames A is being encoded $P_3$ will be encoded by the first video encoding engine, since this encoding engine has the additional reconstruction components and frame $P_3$ is used as the reference frame when the group of frames B (namely $P_4$, $P_5$ and $P_6$) are encoded.

Figure 3B:
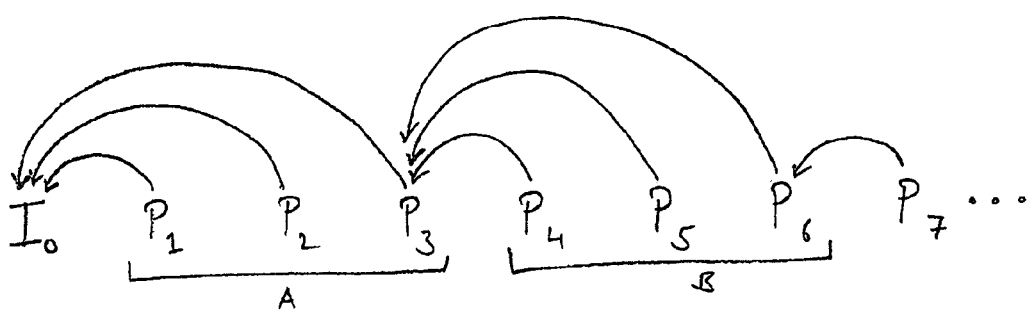
Figure 3C:
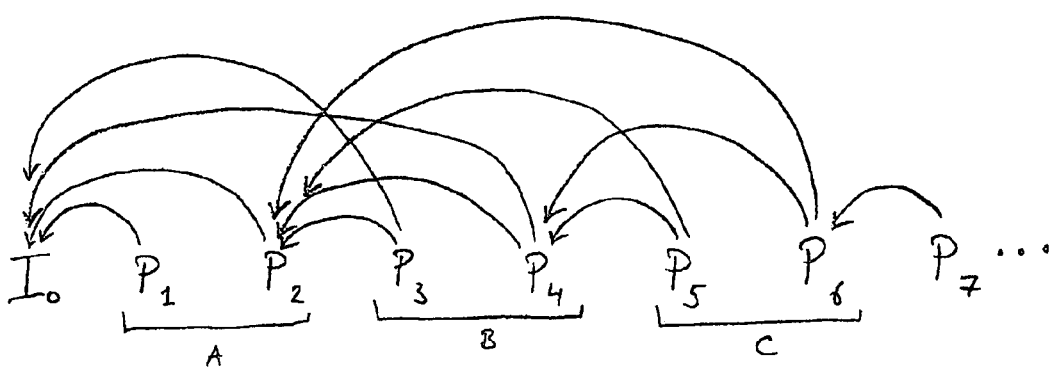

It is also possible for the video encoding engines of video encoder 120 to perform their respective encoding operations with reference to more than one reference frame, as illustrated in FIG. 3C. In this example the video encoder operates two encoding engines, as was the case in the example given in FIG. 3A. Indeed the operation for the pair of frames A is identical to that illustrated with reference to FIG. 3A. However, when reference frames $P_3$ and $P_4$ are encoded (B) each frame is encoded with reference to two preceding frames. Both frames $P_3$ and $P_4$ are encoded with reference to both $I_0$ and $P_2$. The sharing of reference frames between the frames currently being encoded makes efficient use of reference frame cache 135 and allows for an increased frame rate to be handled, without significantly increasing the bandwidth requirement.

Figure 4A:
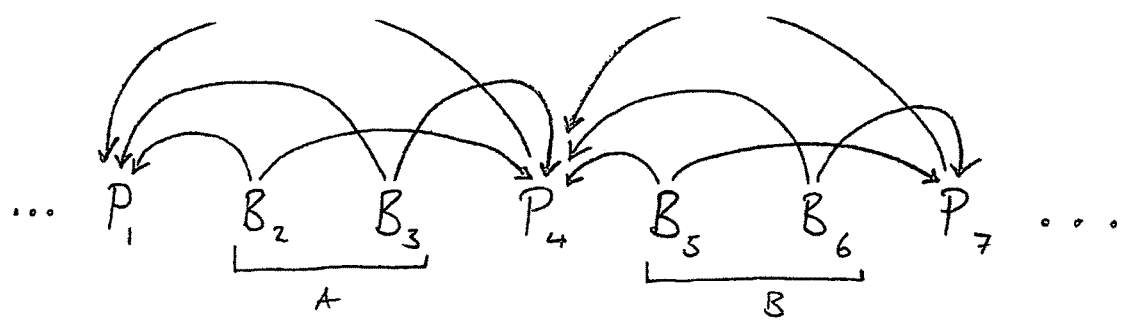
FIGS. 4A and 4B schematically illustrate some encoding patterns of sequential frames including both P-frames and B-frames.

The examples illustrated in FIGS. 3A, 3B and 3C only make use of P-frames, i.e. the video encoding engines of video encoder 120 are only performing mono-directional prediction encoding. In the examples illustrated in FIGS. 4A and 4B however, the video encoding engines of video encoder 120 also perform some bi-directional prediction encoding. In FIG. 4A, the illustrated sequence of frames is PBBPBBP. Frame $P_1$ is a P-frame encoded with reference to at least one previous frame (not illustrated), whilst frames $B_2$ and $B_3$ are bi-directionally predicted frames each of which is predicted with reference to preceding frame $P_1$ and subsequent frame $P_4$. This encoding pattern of course requires that the frames are not encoded in play back order, since both $B_2$ and $B_3$ need to refer to frame $P_4$ and similarly frames $B_5$ and $B_6$ need to refer to frame $P_7$. For this reason the required encoding order for these frames will in fact be $P_1$, $P_4$, $B_2/B_3$, $P_7$, $B_5/B_6$ etc. The techniques of the present invention are applied in this example to the pair of frames $B_2$ and $B_3$ (and similarly $B_5$ and $B_6$), which are encoded in parallel to each other with reference to the same reference frames, namely $P_1$ and $P_4$ (or $P_4$ and $P_7$).

Figure 4B:
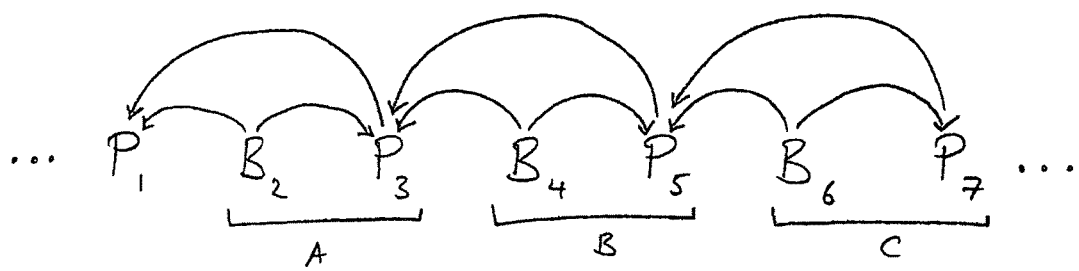

A further variation is illustrated in FIG. 4B which shows the sequence of frames PBPBPBP. In this case the parallel encoding process may be carried out on $B_2$ and $P_3$ (pair A). However, this configuration presents an additional component of complexity, since $B_2$ makes reference to $P_3$, which is encoded in parallel with $B_2$. For this reason in such an example it is necessary to configure the parallel encoding engines to operate slightly offset from one another, specifically that the encoding of $P_3$ is performed sufficiently in advance of $B_2$, such that the reconstructed video data from $P_3$ is available when the encoding of $B_2$ requires it. Although this configuration will hence require greater bandwidth, the benefit resulting in sharing reference frames may nevertheless outweigh this.

Figure 5:
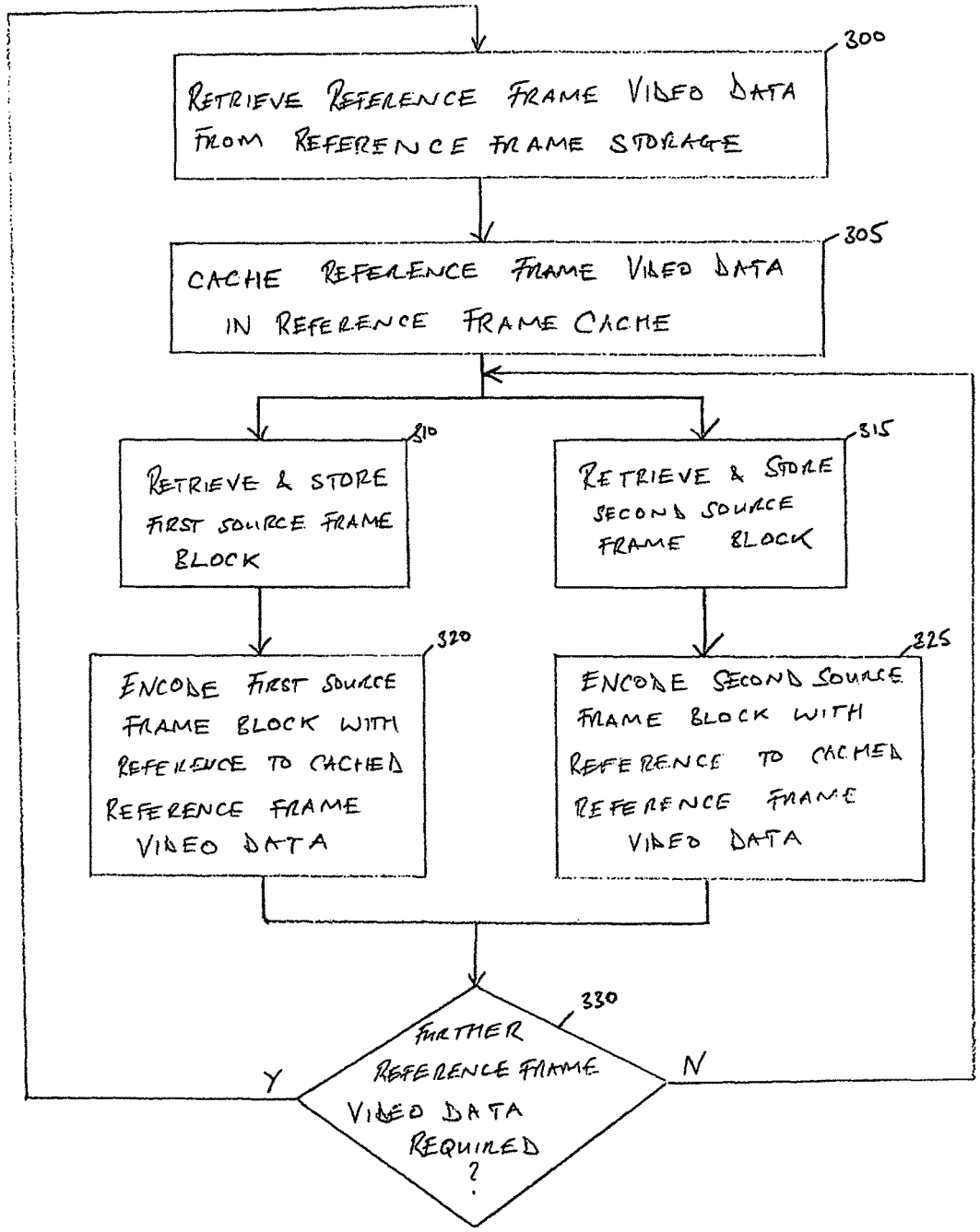
FIG. 5 schematically illustrates a series of steps taken in one embodiment.

FIG. 5 schematically illustrates a series of steps taking in one embodiment. At step 300, reference frame video data is retrieved from a reference frame storage in system memory and at step 305 this reference frame video data is cached in the reference frame cache of the video encoder. The following steps are then performed in parallel with one another, namely steps 310 and 315, where first and second source frame blocks are retrieved from the FIFO in memory and stored in their respective source buffers in the video encoder, and steps 320 and 325, where these first and second source frame blocks are encoded by their respective encoding engines with reference to the same reference frame video data cached in the reference frame cache in the video encoder. The parallel steps recombine at the next step, step 330, where it is determined if further reference frame video data is required to continue encoding. If it is not, then the flow returns to parallel steps 310 and 315 to retrieve further source frame blocks for encoding. However if further reference frame data is required, then the flow returns to step 300 and that reference frame video data is retrieved and then cached.

Hence, according to the techniques of the present invention video encoding may be performed such that a higher frame rate may be handled, without significantly increasing the bandwidth required to pass the necessary video data around in the video system.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A video encoding apparatus for encoding a video stream comprising:
   a reference frame cache configured to cache reference frame video data retrieved from a reference frame storage unit in external memory, said reference frame video data cached in said reference frame cache being derived from an individual frame of said video stream;
   a first source frame storage unit configured to store a first block of unencoded video data taken from a first source frame of said video stream;
   a second source frame storage unit configured to store a second block of unencoded video data taken from a second source frame of said video stream;
   a first video encoder configured to perform a first encoding operation to encode said first block of unencoded video data with reference to said reference frame video data cached in said reference frame cache; and
   a second video encoder configured to perform a second encoding operation to encode said second block of unencoded video data with reference to said reference frame video data cached in said reference frame cache,
   wherein said first video encoder and said second video encoder are configured to perform said first encoding operation and said second encoding operation in parallel with one another.

2. The video encoding apparatus as claimed in claim 1, wherein said video encoding apparatus further comprises at least one further source frame storage unit, each at least one further source frame storage unit configured to store at least one further block of unencoded video data taken from at least one further source frame of said video stream; and
   at least one further video encoder configured to perform at least one further encoding operation to encode said at least one further block of unencoded video data with reference to said reference frame video data cached in said reference frame cache,
   wherein said at least one further video encoder is configured to perform said at least one further encoding operation in parallel with said first encoding operation and said second encoding operation.

3. The video encoding apparatus as claimed in claim 1, wherein at least one of said first video encoder and said second video encoder is configured to perform its respective encoding operation with reference to further reference frame video data cached in said reference frame cache and derived from at least one further individual reference frame.

4. The video encoding apparatus as claimed in claim 3, wherein said video encoding apparatus further comprises at least one further source frame storage unit, each at least one further source frame storage unit configured to store at least one further block of unencoded video data taken from at least one further source frame of said video stream; and
   at least one further video encoder configured to perform at least one further encoding operation to encode said at least one further block of unencoded video data with reference to said reference frame video data cached in said reference frame cache,
   wherein said at least one further video encoder is configured to perform said at least one further encoding operation in parallel with said first encoding operation and said second encoding operation, and
   wherein said at least one further video encoder is configured to perform said at least one further encoding operation with reference to said further reference frame video data cached in said reference frame cache and derived from at least one further individual reference frame.

5. The video encoding apparatus as claimed in claim 1, wherein at least one of said first video encoder and said second video encoder is configured to perform mono-directional prediction encoding.

6. The video encoding apparatus as claimed in claim 1, wherein at least one of said first video encoder and said second video encoder is configured to perform bi-directional prediction encoding.

7. The video encoding apparatus as claimed in claim 1, wherein one of said first video encoder and said second video encoder is configured to perform mono-directional encoding and the other of said first video encoder and said second video encoder is configured to perform bi-directional prediction encoding.

8. The video encoding apparatus as claimed in claim 2, wherein said at least one further video encoder is configured to perform mono-directional prediction encoding.

9. The video encoding apparatus as claimed in claim 2, wherein said at least one further video encoder is configured to perform bi-directional prediction encoding.

10. The video encoding apparatus as claimed in claim 1, wherein said first video encoder is further configured to perform a decoding operation on encoded video data resulting from said first encoding operation to generate a reconstructed block for storage in said reference frame storage unit in said external memory.

11. The video encoding apparatus as claimed in claim 1, wherein said reference frame video data cached in said reference frame cache derived from said individual frame of said video stream comprises neighboring blocks spatially adjacent to said first and second block of unencoded video data.

12. The video encoding apparatus as claimed in claim 1, wherein said first source frame storage unit and said second source frame storage unit are buffers.

13. The video encoding apparatus as claimed in claim 2, wherein said at least one further source frame storage unit is a buffer.

14. The video encoding apparatus as claimed in claim 1, wherein said video stream is retrieved from a FIFO in said external memory.

15. The video encoding apparatus as claimed in claim 1, wherein said video stream is generated in a slow motion recording mode.

16. The video encoding apparatus as claimed in claim 1, wherein said first source frame of said video stream and said second source frame of said video stream are sequential in said video stream.

17. A method of encoding a video stream comprising the steps of:
retrieving reference frame video data from a reference frame storage unit in external memory;
caching said reference frame video data in a reference frame cache, said reference frame video data cached in said reference frame cache being derived from an individual frame of said video stream;
receiving a first block of unencoded video data taken from a first source frame of said video stream;
storing said first block of unencoded video data in a first source frame storage unit;
receiving a second block of unencoded video data taken from a second source frame of said video stream;
storing said second block of unencoded video data in a second source frame storage unit;
performing a first encoding operation to encode said first block of unencoded video data with reference to said reference frame video data cached in said reference frame cache; and
performing a second encoding operation to encode said second block of unencoded video data with reference to said reference frame video data cached in said reference frame cache,
wherein said first encoding operation and said second encoding operation are performed in parallel with one another.

18. The method of encoding a video stream as claimed in claim 17, wherein said method further comprises:
receiving at least one further block of unencoded video data taken from at least one further source frame of said video stream;
storing said at least one further block of unencoded video data in at least one further source frame storage unit; and
performing at least one further encoding operation with reference to said reference frame video data cached in said reference frame cache to encode said at least one further block of unencoded video data,
wherein said at least one further encoding operation is performed in parallel with said first encoding operation and said second encoding operation.

19. The method of encoding a video stream as claimed in claim 17, wherein at least one of said first encoding operation and said second encoding operation is performed with reference to further reference frame video data cached in said reference frame cache and derived from at least one further individual reference frame.

20. The method of encoding a video stream as claimed in claim 18, wherein said at least one further encoding operation is performed with reference to further reference frame video data cached in said reference frame cache and derived from at least one further individual reference frame.

21. The method of encoding a video stream as claimed in claim 17, wherein at least one of said first and second encoding operations comprises mono-directional prediction encoding.

22. The method of encoding a video stream as claimed in claim 17, wherein at least one of said first and second encoding operations comprises bi-directional prediction encoding.

23. The method of encoding a video stream as claimed in claim 17, wherein one of said first and second encoding operations is mono-directional prediction encoding and the other of said first and second encoding operations is bi-directional prediction encoding.

24. The method of encoding a video stream as claimed in claim 18, wherein said at least one further encoding operation is mono-directional prediction encoding.

25. The method of encoding a video stream as claimed in claim 18, wherein said at least one further encoding operation is bi-directional prediction encoding.

26. The method of encoding a video stream as claimed in claim 17, further comprising performing a decoding operation on encoded video data resulting from said first encoding operation to generate a reconstructed block for storage in said reference frame storage unit in said external memory.

27. The method of encoding a video stream as claimed in claim 17, wherein said reference frame video data cached in said reference frame cache derived from said individual frame of said video stream comprises neighboring blocks spatially adjacent to said first and second block of unencoded video data.

28. The method of encoding a video stream as claimed in claim 17, wherein said first source frame storage unit and said second source frame storage unit are buffers.

29. The method of encoding a video stream as claimed in claim 18, wherein said at least one further source frame storage unit is a buffer.

30. The method of encoding a video stream as claimed in claim 17, wherein said video stream is retrieved from a FIFO in said external memory.

31. The method of encoding a video stream as claimed in claim 17, wherein said video stream is generated in a slow motion recording mode.

32. The method of encoding a video stream as claimed in claim 17, wherein said first source frame of said video stream and said second source frame of said video stream are sequential in said video stream.

33. A video encoding apparatus for encoding a video stream comprising:
- a reference frame cache means for caching reference frame video data retrieved from a reference frame storage means in external memory, said reference frame video data cached in said reference frame cache means being derived from an individual frame of said video stream;
- a first source frame storage means for storing a first block of unencoded video data taken from a first source frame of said video stream;
- a second source frame storage means for storing a second block of unencoded video data taken from a second source frame of said video stream;
- a first video encoding means for performing a first encoding operation to encode said first block of unencoded video data with reference to said reference frame video data cached in said reference frame cache means; and
- a second video encoding means for performing a second encoding operation to encode said second block of unencoded video data with reference to said reference frame video data cached in said reference frame cache means,
- wherein said first video encoding means and said second video encoding means are configured to perform said first encoding operation and said second encoding operation in parallel with one another.

* * * * *